(12) United States Patent
Khojastepour et al.

(10) Patent No.: US 8,537,929 B2
(45) Date of Patent: Sep. 17, 2013

(54) MULTICAST CODING METHODS AND SYSTEMS

(75) Inventors: Mohammad Ali Khojastepour, Lawrenceville, NJ (US); Alireza Keshavarz-haddad, Houston, TX (US)

(73) Assignee: NEC Laboratories America, Inc., Princeton, NJ (US)

( * ) Notice: Subject to any disclaimer, the term of this patent is extended or adjusted under 35 U.S.C. 154(b) by 386 days.

(21) Appl. No.: 13/004,564

(22) Filed: Jan. 11, 2011

(65) Prior Publication Data

US 2011/0170626 A1 Jul. 14, 2011

Related U.S. Application Data

(60) Provisional application No. 61/294,125, filed on Jan. 12, 2010.

(51) Int. Cl.
*H04L 27/00* (2006.01)

(52) U.S. Cl.
USPC ........... 375/295; 370/238; 370/312; 370/390; 370/396; 370/432

(58) Field of Classification Search
USPC ......... 375/295; 370/352, 432; 709/204–209, 709/217, 218, 223–240
See application file for complete search history.

(56) References Cited

PUBLICATIONS

Vyetrenko, S.; Tracey Ho; Effros, M.; Kliewer, J.; Erez, E., "Rate rRegions for coherent and noncoherent multisource network error correction," Information Theory, 2009. ISIT 2009. IEEE International Symposium on, vol., No., pp. 1001,1005, Jun. 28-Jul. 3, 2009.*
Grokop, L., et al. "Fundamental Constraints on Multicast Capacity Regions" Proc. Allerton Conference, 2007.*
Avestimehr, A., et al. "A Deterministic Approach to Wireless Relay Networks" Int'l Conf. Info. Theory (ISIT), 2007. (10 Pages).
Avestimehr, A., et al. "Wireless Network Information Flow: A Deterministic Approach" Proc. Allerton Conference, 2007. pp. 1-31.
Grokop, L., et al. "Fundamental Constraints on Multicast Capacity Regions" Proc. Allerton Conference, 2007. (25 Pages).
Prabhakaran, V., et al. "Broadcasting With Degraded Message Sets: A Deterministic Approach" Proc. Allerton Conference, 2007. (8 Pages).
Weingarten, H., et al. "The Capacity Region of the Gaussian Multiple-Input Multiple-Output Broadcast Channel" IEEE Transactions on Information Theory, vol. 52, No. 9. Sep. 2006. pp. 3936-3964.

* cited by examiner

*Primary Examiner* — Daniel Washburn
*Assistant Examiner* — Eboni Hughes
(74) *Attorney, Agent, or Firm* — Joseph Kolodka

(57) ABSTRACT

Methods and systems for coding multicast information signals are disclosed. Signal transformations imposed by communication links with a plurality of receivers that are grouped into subsets of receivers can be determined. In addition, a coding design can be generated by employing dimension parameters that are related to achievable capacity rates of the subsets of receivers and are determined by constraining a sum of the dimension parameters to be less than or equal to a dimension of a union of subspaces of signal values that are receivable by the receivers. Output signals can be generated by applying the coding design to multicast information to compensate for the signal transformations. Further, the output signals can be transmitted to the plurality of receivers.

15 Claims, 2 Drawing Sheets

MULTICAST CODING METHODS AND SYSTEMS

RELATED APPLICATION INFORMATION

This application claims priority to provisional application Ser. No. 61/294,125 filed on Jan. 12, 2010, incorporated herein by reference.

BACKGROUND

1. Technical Field

The present invention relates to multicasting and, more particularly, to multicast coding schemes for adapting data signals to transformations imposed by a communication link.

2. Description of the Related Art

Broadcast channel communication is one of the most important classes of the multi-user communication problem, as it models the most widely utilized practical scenario for multiuser downlink transmission. Much effort has been dedicated to researching broadcast channel transmission in the past few decades and some notable progress has been made. Most work regarding broadcast channel communication has focused on the situation in which independent messages are transmitted to the user and less work has focused on the multicast scenario.

Methods for multicasting different messages to different subsets of users are gaining importance due to the increasing demand for multimedia content. This problem is part of the discussions conducted in current standard study groups, such as those directed to the 3GPP LTE-advanced and IEEE 802.16m standards.

Unfortunately, studies on the multicast capacity region of the broadcast channel are scarcer than those related to the capacity region achievable by individual message or unicast transmission. Even for channels such as multiple-input multiple-output (MIMO) Gaussian broadcast channels, where the unicast capacity region has been fully characterized, the multicast capacity region is still an open problem. A notable example is the simple case of a three-user scalar Gaussian channel for which the multicast capacity has not yet been found. Recent works have achieved some developments with regard to transmission capacity under specific conditions.

A deterministic approach for studying wireless networks was introduced relatively recently. This model addresses both broadcast and interference challenges in a wireless network. However, by removing randomness aspects, this model poses some difficult problems, such as finding the network capacity for particular cases in a manner that is analytically tractable.

SUMMARY

One embodiment is directed to a method for coding multicast information signals. In accordance with the method, indications of signal transformations imposed by communication links with a plurality of receivers that are grouped into subsets are determined. In addition, a coding design is generated by employing dimension parameters that are related to achievable capacity rates of the subsets of receivers and are determined by constraining a sum of the dimension parameters to be less than or equal to a dimension of a union of subspaces of signal values that are receivable by the receivers. Further, output signals are generated by applying the coding design to multicast information to compensate for the signal transformations. The output signals are transmitted to the plurality of receivers.

Another embodiment is directed to a computer readable storage medium including a computer readable program, where the computer readable program when executed on a computer causes the computer to perform several steps. One step includes determining indications of signal transformations imposed by communication links with a plurality of receivers that are grouped into subsets of receivers. Another step includes generating a coding design by employing dimension parameters that are related to achievable capacity rates of the subsets of receivers. The dimension parameters are determined by constraining a sum of the dimension parameters to be less than or equal to a dimension of a union of subspaces of signal values that are receivable by the receivers. An additional step includes applying the coding design to multicast information to generate output signals for transmission to the plurality of receivers.

An alternative embodiment is directed to a system for coding multicast information signals. The system includes a controller that is configured to determine indications of signal transformations imposed by communication links with a plurality of receivers that are grouped into subsets. The controller is further configured to generate a coding design by employing dimension parameters that are related to achievable capacity rates of the subsets of receivers and are determined by constraining a sum of the dimension parameters to be less than or equal to a dimension of a union of subspaces of signal values that are receivable by the receivers. The system also includes a coder and a transmitter. The coder is configured to generate output signals by applying the coding design to multicast information to compensate for the signal transformations. In addition, the transmitter is configured to transmit the output signals to the plurality of receivers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To implement multicasting of information, known methods modify coding schemes that are drawn towards a broadcast model. However, exemplary embodiments according to the present principles employ coding schemes that are designed specifically for multicasting. For example, one aspect of the present principles is directed to the derivation of the achievable rate region for multicasting over a broadcast channel. As indicated above, to the knowledge of the inventors, a comprehensive determination of the achievable rate region for multicasting systems has not yet been made.

Aiming for a tractable problem formulation, a deterministic channel model is adapted herein to compute the achievable rate region using linear inequalities that are formulated in terms of link parameters. As discussed further below, the achievable rate region can be shown to be convex. In the exemplary network model described herein, the transmitted and received signals are configured as vectors in which each element represents part of the information to be transmitted. Each of the information components (i.e., vector elements) can be composed of elements of a finite field. The transmitted signals can be configured in virtually any manner, but the received signal at each destination should be a vector in the column vector space of the transfer function of the corresponding link. Thus, in the exemplary coding schemes described below, the transmitted symbols intended for each user are encoded to be within the space of signals that the user can receive.

With regard to multicasting of information to N destinations in accordance with the network model, there are $2^N$ possible signals that can be transmitted to each subset of users in general. An aspect of the present principles permits the determination of the most efficient partitioning of the whole space into $2^N$ subspaces that are receivable by corresponding subsets of users. Thus, a desired multicast rate can be achieved if the signals targeted for each subset of users are transmitted in the corresponding space allocated to the respective subset. Furthermore, the computational complexity of finding and applying the coding scheme can be substantially reduced by employing formulations that equate the dimensions of subsets of the subspaces to corresponding dimension parameters, which in turn are related to the achievable rate regions for the subsets of users by inequality formulations.

The concepts described herein can be applied to more general cases of vector channel models, such as multiple antenna Gaussian channels. As discussed further herein below, the concepts can be employed to find a set of precoding vectors and corresponding time shares for the transmission of information to each subset of users. In particular, the signal targeted to each user is precoded with a specific precoder and is transmitted in a specific, predetermined time share for each block of transmission.

Figure 1:
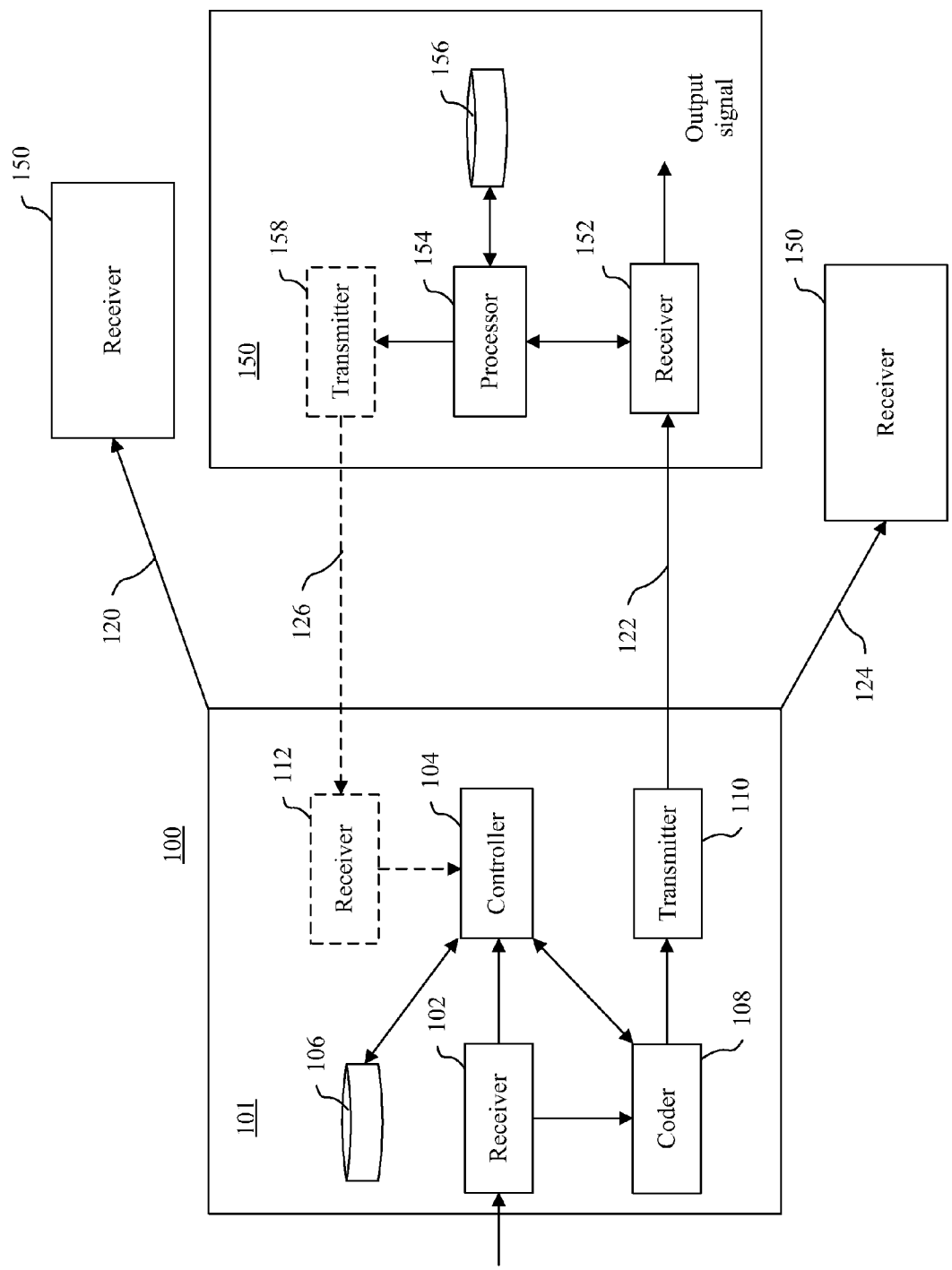
FIG. 1 is a block/flow diagram of an exemplary communication system embodiment.

Referring now in detail to the figures in which like numerals represent the same or similar elements and initially to FIG. 1, an exemplary communication system embodiment 100 is illustrated. The system 100 can include a transmitter system 101 and a plurality of receiver systems 150. Although only three receiver systems are shown for simplicity purposes, the communication system 100 can accommodate a much larger number of receivers. The transmitter 101 can be configured to transmit multicast information to the receivers 150, which can be assembled into various multicast groups in a non-exclusive manner. In other words, the transmitter 110 can include a receiver 150 in more than one multicast group. The communication links 120-124 on which the multicast information is transmitted can be wired or wireless links. In particular, the communication system 100 can be any system in which the information signals transmitted between the transmitter 101 and a receiver 150 is characterizable as vector inputs and outputs. For example, the communication system 100 can be part of a wired network, such as a wired optical network, or a wireless network, such as multiple antenna systems.

The transmitter system 101 can include a receiver 102, a coder 108, a controller 104, a storage medium 106, an optional receiver 112 and a transmitter 110. The receiver 102 can be configured to process and receive information for transmission to the receivers 150. In particular, the receiver 102 can be configured to output symbols or bits denoting the information intended for one or more receivers. In turn, the coder 108 can order the symbols into an information matrix $X_m^0$, discussed in more detail below, for transmission during a time frame m. Further, the coder 108 can be configured to code the information matrix by applying a coding matrix generated by the controller 104. The coding matrix can be configured to compensate for transformations imposed by a communication link. For example, in a multiple antenna wireless transmission system, the coding matrix can be a precoding matrix. Here, the controller 104 can base the precoding matrix on channel state information for the links between the transmitter system 101 and the receiver systems 150, as discussed in more detail herein below. For example, the receiver 112 can optionally be configured to receive a channel quality index (CQI) from each receiver 150 over wireless or wired feedback links 126. After the information signal has been coded, the coder 108 can provide the coded signal to the transmitter 110 for downlink transmission to the receivers 150 over communication links 120-124. It should be noted that the controller 104 can be configured to implement method embodiments described herein below. For example, the controller 104 can be a processor that implements instructions of a program stored on the storage medium 106. Alternatively, the controller 104 can be embodied exclusively in hardware elements.

Each receiver system 150 can include a receiver 152, a processor 154, a storage medium 156 and an optional transmitter 158. The receiver 152 can be configured to process signals received from the transmitter system 101 with the aid of a processor 154, which can be configured to manage operations in the receiver 150. Similar to the controller 104, the processor 154 can employ a storage medium to execute one or more programs of instructions. In addition, the processor 154 can be configured to process signals received from the transmitter 110 to determine a CQI using power measurements, etc., as understood in the art. In turn, the transmitter 158 can transmit the CQI to the transmitter system 101 via a feedback link 126.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. The program code can be configured to implement method steps described herein below. Further, a computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Prior to describing the generation of a coding design in detail, a brief description of the network model employed by exemplary embodiments is provided. Here, a wireless broadcast channel based on a deterministic model is considered. It can be assumed that the network includes 1+N nodes, where one of the nodes is the source and the rest of the nodes are destinations. The source node is denoted by $\Phi_0$ and the destination nodes or receivers are denoted by $\Phi_k$, where $k=1, 2, \ldots, N$.

The multicast achievable rate region of the broadcast channel can be defined as follows. For every set of destinations $\mathcal{A} \subseteq \{1, 2, \ldots, N\}$, $\lambda_\mathcal{A}$ denotes the rate of a common message $w_\mathcal{A}$ that is decodable by all nodes in $\mathcal{A}$. A set of rates $\{\lambda_\mathcal{A}\}_{\mathcal{A} \subseteq \{1, 2, \ldots, N\}}$ is deemed achievable if the messages $w_\mathcal{A}$ can be simultaneously sent, and decoded, at the rate $\lambda_\mathcal{A}$ for all sets $\mathcal{A} \subseteq \{1, 2, \ldots, N\}$. The problem of finding the achievable rates of a system is defined as finding the set of all possible rate sets $\{\lambda_\mathcal{A}\}_{\mathcal{A} \subseteq \{1, 2, \ldots, N\}}$. To characterize the achievable rate region, the conditions on $\lambda_\mathcal{A}$, s that render a set of rates $\{\lambda_\mathcal{A}\}_{\mathcal{A} \subseteq \{1, 2, \ldots, N\}}$ achievable is determined.

In this channel model, the output signal from node $\Phi_0$ at time slot t is considered as a column vector $y_t^k = [y_{t,1}^k, y_{t,2}^k, \ldots, y_{t,q}^k]^\dagger$ of size q, where each element is a value in a Galois Field $\mathbb{F}(p^n)$ for some prime number p and positive integer n. Here, † is used to denote the matrix transpose operation.

Each link from the node $\Phi_0$ to $\Phi_k$ in the network is denoted by its transfer function $G_k$, which is a q×q matrix having entries in $\mathbb{F}(p^n)$. The output of this link (i.e. the input of $\Phi_k$) is equal to $x_t^k = G_k y_t^0$.

If the received vectors at multiple nodes $\Phi_k$, $k \in \mathcal{A} = \{i_1, \ldots, i_a\}$ among the destinations, are stacked together, then the transfer function is given by $$\begin{bmatrix} x_t^{i_1} \\ x_t^{i_2} \\ \vdots \\ x_t^{i_n} \end{bmatrix} = \begin{bmatrix} G_{i_1} \\ G_{i_2} \\ \vdots \\ G_{i_n} \end{bmatrix} y_t^0 = G_\mathcal{A} \cdot y_t^0 \quad (1)$$

The above-referenced notation for $G_\mathcal{A}$ will be used below.

The focus of this channel model is on the characteristics of the link, for which the noise at the receivers is ignored. The model leads to more a tractable problem definition for the achievable rate and the result could, for example, represent the high SNR approximation of a Gaussian network. For example, it has been shown that the achievable rate for a general Gaussian network is within a constant difference away from the result obtained from the deterministic channel approximation.

Turning now to time-frame operations for linear coding schemes, each node performs a linear operation over a time-frame of T time slots. For example, the source can stack together T vectors $x_t^0$, $t = mT+1, \ldots, mT+T$ at time-frame m, and can then map them by a matrix F of size qT×qT to find qT new symbols, which are outgoing symbols. Then, the source node can put these symbols into T column vectors $y_t^0$, $t = (m+1)T+1, \ldots, (m+1)T+T$ that will be transmitted in the next T time-frame (time-frame m+1). The linear operation can be formulated as:

$$Y_{m+1}^0 = F \cdot X_m^0 \quad (2)$$

where $X_m^0 = [x_{Tm+1}^0, \ldots, x_{Tm+T}^0]^\dagger$ and $Y_{m+1}^0 = [y_{T(m+1)+1}^0, \ldots, y_{T(m+1)+T}^0]^\dagger$.

Let $H_\mathcal{A} = I \otimes G_\mathcal{A}$ where $\otimes$ is the Kronecker matrix product and I is a T×T identity matrix. Hence, from $x_t^k = G_k y_t^0$, $$X_m^k = H_k \cdot Y_m^0. \quad (3)$$

Figure 2:
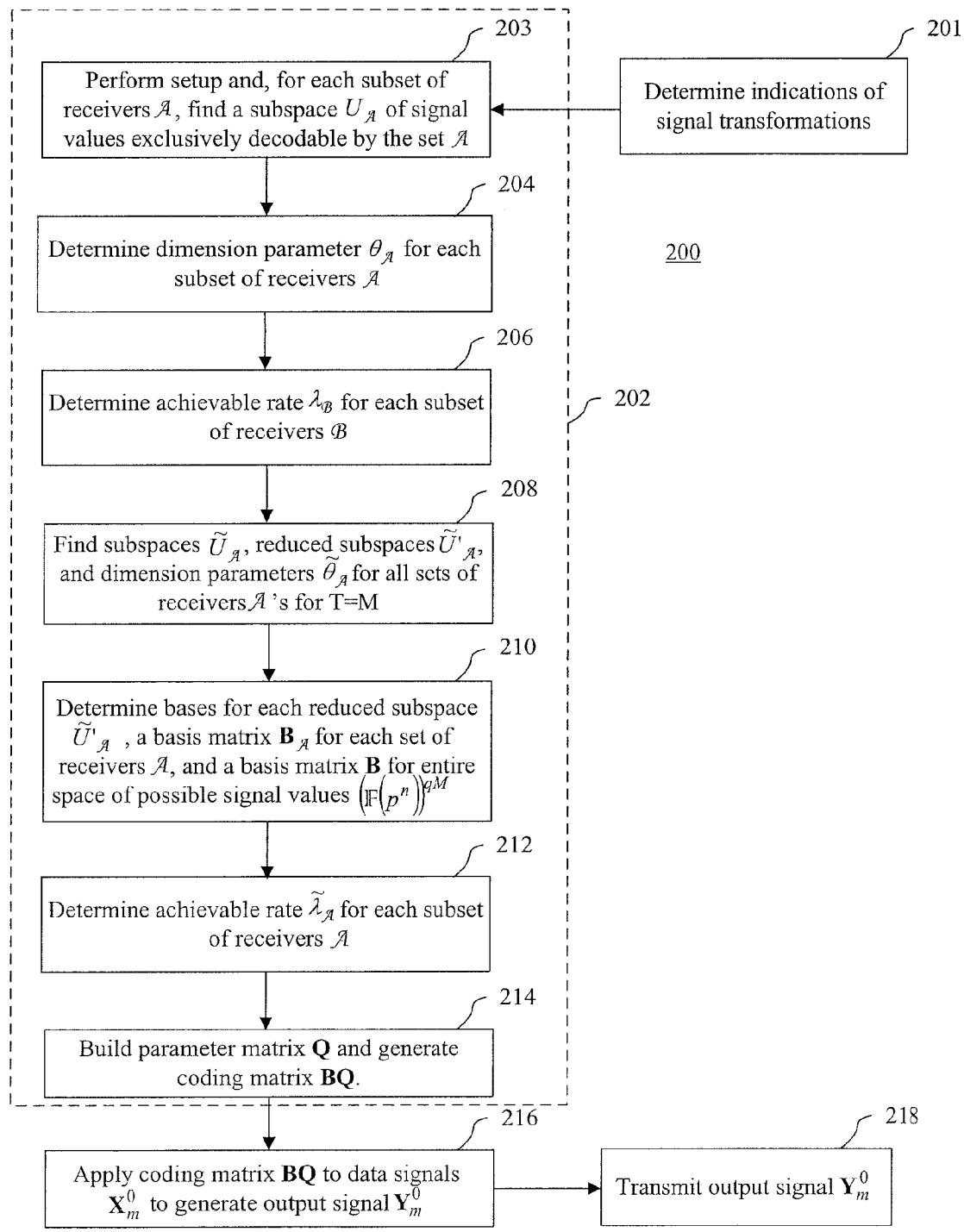
FIG. 2 is a flow diagram of an exemplary embodiment of a method for coding information signals.

Referring now to FIG. 2 with continuing reference to FIG. 1, a method 200 for transmitting signals in accordance with an exemplary embodiment is illustrated. The method can begin at step 201, in which the controller 104 can determine indications of signal transformations imposed by communication links with a plurality of receivers 150 grouped into subsets. For example, the controller 104 can determine $H_k$ and/or $G_k$. The values of $H_k$ and/or $G_k$ can be pre-stored on the storage medium 106. Alternatively, $H_k$, which is dependent on the transfer function $G_k$, can be determined from information received from the receivers 150 through feedback links 126. The information can be an indication of channel conditions on the downlink channels from the transmitter system 101 to the receivers 150. For example, the indication of channel conditions can be a CQI.

At step 202, the controller 104 can generate a coding design to compensate for the signal transformations. For example, the coding design can be implemented as a coding matrix that can be applied to an information matrix $X_m^0$ denoting multicast information directed to the subsets of receivers at time frame m. In accordance with one exemplary embodiment, steps 203-214 can be performed to generate the coding design.

For example, at step 203, the controller 104 can perform a setup process and, for each set of receivers $\mathcal{A}$ the controller 104 can find a corresponding subspace $U_\mathcal{A}$ of signal values exclusively decodable the set of receivers $\mathcal{A}$ According to one aspect, the controller 104 can focus on a block of size T symbols and can model the signals received at destinations $\Phi_k$ as $X_m^k = H_k \cdot Y_m^0$. Further, the controller 104 can consider the null space of this transformation as Null$(H_k) = \{Y \in \mathbb{F}(p^n)^{qT} | H_k Y = 0\}$. In particular, the controller 104 defines $V_k$ as $V_k = \mathbb{F}(p^n)^{qT} \backslash \text{Null}(H_k)$. Here, the operator "\" is used to denote the extended quotient space of two vector spaces V and V' as V\V', which is defined as the largest subspace of V that is complementary with V∩V'. Notice that given V and V', the space V\V' is not necessarily unique. The aim is to find the set of vectors which can be uniquely decoded by $\Phi_k$ in a time-frame. For every set of destinations $\mathcal{A} = \{i_1, \ldots, i_a\}$, $V_\mathcal{A}$ is denoted as a maximal subspace decodable by all nodes of $\mathcal{A}$ i.e., $V_\mathcal{A} = V_{i_1} \cap \ldots \cap V_{i_a}$. Here, the controller 104 can determine the exclusive subspace of signal values decodable by the set of receivers $\mathcal{A}$ as follows: $U_\mathcal{A} = \text{Null}(H_\mathcal{A}) \cap V_\mathcal{A}$ $U_\mathcal{A}$ is a subspace (with the largest dimension) decodable by all nodes of $\mathcal{A}$ but not any other node. For $\mathcal{A} = \{1, 2, \ldots, N\}$, we can define $U_\mathcal{A} = V_\mathcal{A}$ Notice that $V_k$'s are not uniquely defined above, and $U_\mathcal{A}$, s are computed in terms of $V_k$'s. Here, the size of our achievability region depends on $U_\mathcal{A}$, s. We try to construct $V_k$'s such that the dimension of $U_\mathcal{A}$, s are maximized.

At step 204, the controller 104 can determine a dimension parameter $\theta_\mathcal{A}$ for each set of receivers $\mathcal{A}$ For example, the achievable rate region can described based on positive real numbers $\theta_\mathcal{A}$ where $\mathcal{A}$ is the set of destinations, as noted above. The parameters $\theta_{\mathcal{A}} \geq 0$ should be chosen such that the following inequalities hold, assuming that $U_{\mathcal{A}}$, s are computed for time-frame size T=1:

$$\theta_{\mathcal{A}_1} + \ldots + \theta_{\mathcal{A}_m} \leq dim(U_{\mathcal{A}_1} + \ldots + U_{\mathcal{A}_m}) \quad (4)$$

for any positive integer m and any selection of distinct subsets of destinations $\mathcal{A}_1, \ldots, \mathcal{A}_m$. As discussed further herein below, the dimension parameters $\theta_{\mathcal{A}}$ can be useful in determining the achievable rate region and in the construction of a coding matrix.

At step 206, the controller 104 can determine the achievable rate $\lambda_{\mathcal{B}}$ for each subset of receivers $\mathcal{B}$. In particular, exemplary embodiments of the controller 104 can determine the achievable rate $\lambda_{\mathcal{B}}$ by employing the following theorem.

Theorem 1: For any set of $\theta_{\mathcal{A}_w}$ satisfying (4), the set of rates {n log$_2$(p)· $\lambda_{\mathcal{B}}$ } for all subsets of destination $\mathcal{B}$. is simultaneously achievable if $\exists \alpha_{\mathcal{A}}^{\mathcal{B}} \in \mathfrak{R}^+$ such that for all subsets of destinations $\mathcal{B}$. and all b∈ $\mathcal{B}$.

$$\lambda_{\mathcal{B}} \leq \sum_{b \in \mathcal{A}} \alpha_{\mathcal{A}}^{\mathcal{B}} \quad (5)$$

also for all sets of destinations $\mathcal{A}$ $$\sum_{\mathcal{B}} \alpha_{\mathcal{A}}^{\mathcal{B}} \leq \theta_{\mathcal{A}} \quad (6)$$

The proof of Theorem 1 is omitted for brevity purposes.

With regard to the notation in Theorem 1, $\mathcal{B}$. can be any subset selected from $\mathcal{A}_1, \ldots, \mathcal{A}_m$. Here, $\mathcal{B}$. is simply used for convenience purposes, where $\mathcal{B}$. and $\mathcal{A}$ can each correspond to a different subset selected from $\mathcal{A}_1, \ldots, \mathcal{A}_m$. For example, in equation (5) the sum $$\sum_{b \in \mathcal{A}} \alpha_{\mathcal{A}}^{\mathcal{B}}$$

is taken over the subsets $\mathcal{A}$ that have one or more common nodes with the subsets $\mathcal{B}$. (including $\alpha_{\mathcal{A}}^{\mathcal{B}=\mathcal{A}}$). In addition, the sum $$\sum_{\mathcal{B}} \alpha_{\mathcal{A}}^{\mathcal{B}}$$

in equation (6) is taken over the subsets $\mathcal{B}$. that have one or more common nodes with the subset $\mathcal{A}$ (including $\alpha_{\mathcal{A}=\mathcal{B}}^{\mathcal{B}}$).

It should be noted that $\theta_{\mathcal{A}}$ in (4) are not uniquely determined. Every set of $\theta_{\mathcal{A}}$, s which satisfy (4) will give an achievable rate region for $\lambda_{\mathcal{A}}$, s. Therefore, the controller 104 can obtain a larger achievable rate region by taking the convex hull of all such achievable rate regions by considering different $\theta_{\mathcal{A}}$, s. The result is denoted as the "merger achievability region." Clearly, the shape of this region does not depend on $\theta_{\mathcal{A}}$, s, but only $U_{\mathcal{A}}$ subspaces.

It should be further noted that the achievable rate region in Theorem 1 is convex for any given choice of the set $\theta_{\mathcal{A}}$, s. This follows due to the fact that the rate region derived in Theorem 1 is based on some linear inequalities. Furthermore, it can be shown that if all possible sets of $\theta_{\mathcal{A}}$, s satisfying (4) are considered, then the sets of achievable rates in Theorem 1 are convex sets. Accordingly, there is no need for a convex hull operation in the calculation of the achievable rate region. The convexity property of the rate region derived in Theorem 1 is formally described in Corollaries 2 and 3 herein below. The proofs of Corollaries 2 and 3 have been omitted for brevity purposes.

Corollary 2: Assume a set of $\theta_{\mathcal{A}}$, s satisfying (4). The set of rates $\lambda_{\mathcal{B}}$, s obtained in Theorem 1 will be a convex set.

Corollary 3: Assume all sets of $\theta_{\mathcal{A}}$, s satisfying (4). The set of $\lambda_{\mathcal{B}}$, s can be found from Theorem 1 by considering that all choices of $\theta_{\mathcal{A}}$, s will be a convex set.

Moreover, regarding equation (4), another useful property of the spaces $U_{\mathcal{A}_1} + \ldots + U_{\mathcal{A}_m}$ is that, if the condition $\theta_{\mathcal{A}_1} + \ldots + \theta_{\mathcal{A}_m} \leq dim(U_{\mathcal{A}_1} + \ldots + U_{\mathcal{A}_m})$ holds for all $\mathcal{A}$ then there exists subspaces $U'_{\mathcal{A}} \subseteq U_{\mathcal{A}}$ such that $dim(U'_{\mathcal{A}}) = \theta_{\mathcal{A}}$, and $U'_{\mathcal{A}}$, s are complementary subspaces (i.e. $dim(\Sigma_i U'_{\mathcal{A}_i}) = \Sigma_i \theta_{\mathcal{A}_i}$). This property is referred to herein as Lemma 4. The proof is also omitted for brevity purposes.

The controller 104 can find the subspaces $U'_{\mathcal{A}}$ as follows. The controller 104 can reduce the dimension of $U_{\mathcal{A}_1}, \ldots, U_{\mathcal{A}_r}$ as much as possible without violating (4). In the reduction process, the controller 104 chooses a nonzero vector v∈ $U_{\mathcal{A}_i}$ and then reduces $U_{\mathcal{A}_i}$ to $U_{\mathcal{A}_i} \setminus \{\alpha v\}$. The controller 104 iterates the process until the dimensions of $U_{\mathcal{A}_i}$, s becomes minimal, i.e., reducing a $U_{\mathcal{A}_i}$ any further contradicts the inequality in equation (4). When the reduction process stops, there should be some cases of $\mathcal{A}_1, \ldots, \mathcal{A}_m$ in which equation (4) becomes equality.

It should be further noted that, with regard to the computability of the rate region derived in Theorem 1, it can be shown that it is sufficient to consider a finite set of $\theta_{\mathcal{A}}$, s. Indeed, instead of considering all possible $\theta_{\mathcal{A}}$, s satisfying (4), it is sufficient to consider only non-negative integer values and to perform a convex hull operation on the values. This result is described more formally in Lemma 5 below. The proof of Lemma 5 is also omitted for brevity purposes. Because the set of dimension parameters $\theta_{\mathcal{A}}$, s are bounded by the dimension of the subspaces decodable by different subsets $\mathcal{A}$, s, it can be assumed that the set of dimension parameters $\theta_{\mathcal{A}}$, s should be bounded by the rank of the transfer functions of the link as well.

Lemma 5: The set of $\theta_{\mathcal{A}}$, s that satisfy equation (4) are convex. This convex set is obtained by intersecting some hyper-planes in $(\mathbb{F}(p''))^q$. The corner points of this convex set will have non-negative integer coordinates. Therefore, to find the achievable rate region in Theorem 1, it is sufficient to compute the rate region for non-negative integer $\theta_{\mathcal{A}}$, s and take the convex hull of the integers.

Although Lemma 5 shows that the vertices of the convex region of $\theta_{\mathcal{A}}$ have only integer coordinates, in some cases it is possible to confine the set of $\theta_{\mathcal{A}}$ even more. An interesting case happens when the rows of $G_k$ are a constant factor of $\{0, u_1, \ldots, u_q\}$, where $u_i$ (i=1, \ldots, q) is a basis of $(\mathbb{F}(p''))^q$. It can be shown that, under such assumptions, $\theta_{\mathcal{A}} = dim(U_{\mathcal{A}})$. This formulation represents a practical scenario in which there are q orthogonal channels but each receiver can receive only some of the channels. Thus, an explicit expression for the achievability region can be provided.

The explicit expression for the dimension parameter $\theta_{\mathcal{A}}$ can be found as follows. Let $S^{(l)}$ denote the set of all subsets of size $0 \leq l \leq |S|$ for any set S. For any subset of destinations $\mathcal{A}$, $\theta_{\mathcal{A}}$ can be explicitly evaluated in terms of the rank of the channel transfer functions $G_\upsilon$ as follows $$\theta_{\mathcal{A}} = \xi_{\mathcal{A}} - \sum_{\mathcal{A} \subseteq S \in \mathcal{M}(|\mathcal{A}|+1)} \xi_S - \sum_{\mathcal{A} \subseteq S \in \mathcal{M}(|\mathcal{A}|+2)} \xi_S + \sum_{\mathcal{A} \subseteq S \in \mathcal{M}(|\mathcal{A}|+3)} \xi_S + \ldots \quad (8)$$

where $$\xi_S = \sum_{\mathcal{V} \in S^{(1)}} |G_\mathcal{V}| - \sum_{\mathcal{V} \in S^{(2)}} |G_\mathcal{V}| + \sum_{\mathcal{V} \in S^{(3)}} |G_\mathcal{V}| - \ldots \quad (9)$$

Here |.| is used to denote the rank of matrices. Based on the above assumptions for $G_k$, it can be shown that $\theta_{\mathcal{A}}$ is the number of $u_i$'s which are in $G_k$ only for all $k \in \mathcal{A}$ As discussed further herein below, a coding scheme that enables the attainment of any point in the achievable rate region can depend on the parameters $\theta_{\mathcal{A}}$ and $\alpha_{\mathcal{A}}^{\mathcal{B}}$. The following describes how such a coding scheme can be found and specified for a larger time frame.

For example, the controller 104 can choose the frame size to be a sufficiently large number M. Specifically, the controller 104 can set T=M, where M is a relatively large number. Let $\tilde{\upsilon}_{\mathcal{A}}$ denote subspaces that are the same as subspaces $U_{\mathcal{A}}$ except that T=M. In addition, let $\tilde{\theta}_{\mathcal{A}} = [M\theta_{\mathcal{A}}]$ for all $\mathcal{A}$, s.

At step 208, the controller 104 can find subspaces $U_{\mathcal{A}}$ reduced subspaces $\tilde{\upsilon}'_{\mathcal{A}}$, and dimension parameters $\tilde{\theta}_{\mathcal{A}}$ for all sets of receivers $\mathcal{A}$, s for T=M. For example, the controller 104 can compute the subspaces $\tilde{\upsilon}_{\mathcal{A}}$ and $\tilde{\theta}_{\mathcal{A}}$ as discussed above with respect to subspaces $U_{\mathcal{A}}$ and dimension parameters $\tilde{\theta}_{\mathcal{A}}$, but with T=M. In turn, the controller 104 can find the reduced subspaces $\tilde{\upsilon}'_{\mathcal{A}}$ as discussed above with regard to Lemma 4 and can define $\tilde{U}'_0 = (\mathbb{F}(p''))^{qM} \setminus (\Sigma_{\mathcal{A}} \tilde{\upsilon}_{\mathcal{A}})$ and $\tilde{\theta}_0 = \dim(\tilde{U}'_0)$. As indicated above with respect to equations (4)-(6), the dimension parameters are related to achievable capacity rates of the subsets of receivers and can be determined by constraining a sum of the dimension parameters to be less than or equal to the dimension of a union of subspaces of signal values that are receivable by the receivers. Further, as provided above with respect to Lemma 4, the controller 104 can determine a reduced subspace for each of the subspaces such that the dimension of each reduced subspace is equal to the dimension parameter for a corresponding subset and such that a dimension of a union of the reduced subspaces is equal to the sum of the dimension parameters.

At step 210, the controller 104 can determine bases for each reduced subspace $\tilde{\upsilon}'_{\mathcal{A}}$, a basis matrix $\mathbf{B}_{\mathcal{A}}$ for each set of receivers $\mathcal{A}$, and a basis matrix B for the entire space of possible signal values $(\mathbb{F}(p''))^{qM}$. For example, the controller 104 can determine a basis $\{v_1, v_2, \ldots, v_{\tilde{\theta}_{\mathcal{A}}}\}$ for each $\tilde{\upsilon}'_{\mathcal{A}}$. In addition, the controller 104 can define a basis matrix for a set of receivers $\mathcal{A}$ as $\mathbf{B}_{\mathcal{A}} = [v_1\ v_2 \ldots v_{\tilde{\theta}_{\mathcal{A}}}]$ and can define a basis matrix for $(\mathbb{F}(p''))^{qM}$ as $B = [B_0\ B_{\{1\}}\ B_{\{2\}} \ldots B_{\{1, 2, \ldots, N\}}]$. Because subspaces $\tilde{\upsilon}'_{\mathcal{A}}$ are complementary subspaces, the columns of B are a basis for $(\mathbb{F}(p''))^{qM}$. In other words, B is a qM×qM non-singular matrix.

At step 212, the controller 104 can determine an achievable rate $\tilde{\lambda}_{\mathcal{A}}$ for each subset of receivers $\mathcal{A}$. For example, the controller 104 can define $\tilde{\lambda}_{\mathcal{A}} = [M\{\lambda_{\mathcal{A}}\}_{\mathcal{A}}]$ for all $\mathcal{A}$, s and can set $\tilde{\lambda}_0 = qM - (\Sigma_{\mathcal{A} \neq 0} \tilde{\lambda}_{\mathcal{A}})$. It can be assumed that the input vector of every time-frame m, i.e., $X_m^0$, has $2^M$ sections of size $\tilde{\lambda}_0$, $\tilde{\lambda}_{\{1\}}, \ldots, \tilde{\lambda}_{\{1, 2, \ldots, N\}}$ corresponding to the information that is multicast to the destinations in each time-frame.

At step 214, the controller 104 can build a parameter matrix Q and can generate the coding matrix BQ. For example, the controller 104 can construct a qM×qM matrix Q as follows. The controller 104 can divide the rows of Q into $2^N$ sections of size $\tilde{\theta}_0, \tilde{\theta}_{\{1\}}, \ldots, \tilde{\theta}_{\{1, 2, \ldots, N\}}$. Similarly, the controller 104 can divide the columns of Q into $2^N$ sections of size $\tilde{\lambda}_0, \tilde{\lambda}_{\{1\}}, \ldots, \tilde{\lambda}_{\{1, 2, \ldots, N\}}$. As such, by sectioning the rows and columns in this manner, the controller 104 divides Q into $2^{2N}$ blocks. It should be noted that the controller 104 here does not section or allocate rows or columns for any particular multicast group $\tilde{\theta}_{\{x, \ldots\}}$ that does not exist in a practical application.

To complete the generation of matrix Q, for each $\alpha_{\mathcal{A}}^{\mathcal{B}}$ the controller 104 can select $\alpha_{\mathcal{A}}^{\mathcal{B}}$ rows of Q among section $\tilde{\theta}_{\mathcal{A}}$ and can then fill the lateral portions of these selected rows where the rows overlap with $\tilde{\lambda}_{\mathcal{B}}$, i.e. inside the block denoted by $\tilde{\theta}_{\mathcal{A}}$ and $\tilde{\lambda}_{\mathcal{B}}$, where $\mathcal{B}$. and $\mathcal{A}$ correspond to a given $\alpha_{\mathcal{A}}^{\mathcal{B}}$ Here, the block denoted by $\tilde{\theta}_{\mathcal{A}}$ and $\tilde{\lambda}_{\mathcal{B}}$, can be filled with randomly selected numbers taken from $\mathbb{F}(p'')$. The non-filled sections of the matrix Q are zeros. Thus, the controller 104 can populate the parameter matrix in overlapping partitions of rows and columns corresponding to subsets having at least one common receiver. Clearly, from inequality (6) we can conclude that such selection of rows of Q is feasible for all $\tilde{\theta}_{\mathcal{A}}$ sections. Although the selection of $\alpha_{\mathcal{A}}^{\mathcal{B}}$ rows of Q among section $\tilde{\theta}_{\mathcal{A}}$ can be random, they can be selected in an order and manner that is known by the receivers 150 to simplify decoding at the receivers. Using Q, the controller 104 can generate the coding matrix BQ for transmission to the coder 108. Here, in a scenario in which the communication link between the transmitter system 101 and the receiver systems 150 are representable as multiple antenna Gaussian channels, the coding matrix BQ be employed as a precoding matrix.

At step 216, the coder 108 can generate output signals by applying the coding design to multicast information to compensate for the signal transformations imposed by the communication links 120-124 with the receivers 150. For example, the coder 108 can apply the coding matrix BQ to the information matrix $X_m^0$ to generate the output signal $Y_m^0 = F \cdot X_m^0 = BQ \cdot X_m^0$ for transmission to the set of receivers $\mathcal{A}$ on a broadcast channel at time frame M.

At step 218, the transmitter 210 can transmit the output signals to the plurality of receivers 150. For example, the transmitter 210 can transmit the output signal $Y_m^0$ to the set of receivers $\mathcal{A}$ at time frame m. Here, each destination or receiver b can receive $\tilde{\lambda}_{\mathcal{B}}$, symbols corresponding to the information multicasted to nodes of $\mathcal{B}$. for every $\mathcal{B}$. in which the receiver b is included.

For example, a set of symbols $S_1, \ldots, S_k \in \mathbb{F}(p'')$ among $\tilde{\lambda}_{\mathcal{B}}$, symbols of $X_m^0$ and a destination $b \in \mathcal{B}$. are considered. Based on the construction of Q described above and inequality (5), $\Sigma_{b \in \mathcal{A}}^{\alpha_{\mathcal{A}}^{\mathcal{B}} \geq \tilde{\lambda}_{\mathcal{B}}}$ rows of Q, where each row provides a random linear combination of $S_1, \ldots, S_k$, will be received by destination b. The destination node will be able to find at least k linearly independent combinations of $S_1, \ldots, S_k$ with probability of at least $1 - |\mathcal{B}. |p^{-n(\tilde{\lambda}_{\mathcal{B}}, -k)}$. If the source node chooses k such that $\tilde{\lambda}_{\mathcal{B}}, -k$ is large but relatively very small compared to $\tilde{\lambda}_{\mathcal{B}}$, (i.e., $k \cong \tilde{\lambda}_{\mathcal{B}}$, ), then $S_1, \ldots, S_k$ will be decodable by destination b with a high probability.

Thus, based on the channel model described above, node b receives $H_b \cdot BQX_m^0$. From the received signals, the node b can decode a unique vector $X \in V_b$, where X is uniquely written as a linear combination of columns which correspond to those dimension parameters $\tilde{\theta}_{\mathcal{A}}$ for subsets $\mathcal{A}$ in which b is included. Therefore, b can uniquely compute s from X.

It should be noted that at each time-frame, $n \log_2(p) k/T \cong n \log_2(p) \tilde{\lambda}_{\mathcal{B}}/T$ information bits can be multicasted to the nodes of $\mathcal{B}$. In other words, the average multicast rate per time-slot is $n \log_2(p) \tilde{\lambda}_{\mathcal{B}}/T \cong n \log_2(p) \lambda_{\mathcal{B}}$ Having described preferred embodiments of multicast coding methods and systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for coding multicast information signals, the method comprising:
   determining indications of signal transformations imposed by communication links with a plurality of receivers that are grouped into subsets of receivers;
   generating a coding design by employing dimension parameters that are related to achievable capacity rates of the subsets of receivers and are determined by constraining a sum of the dimension parameters to be less than or equal to a dimension of a union of subspaces of signal values that are receivable by the receivers;
   generating output signals by applying the coding design to multicast information to compensate for the signal transformations; and
   transmitting the output signals to the plurality of receivers,
   wherein each dimension parameter is determined for a different subset of receivers,
   wherein each subspace of signal values corresponds to a different subset of receivers and denotes signal values that are receivable by receivers in a corresponding subset, and
   wherein the generating further comprises determining a reduced subspace for each of the subspaces such that the dimension of each reduced subspace is equal to the dimension parameter that corresponds to the subset to which the reduced subspace corresponds and such that a dimension of a union of the reduced subspaces is equal to the sum of the dimension parameters.

2. The method of claim 1, wherein each subspace of signal values are receivable only by receivers in the subset corresponding to the subspace.

3. The method of claim 1, wherein the generating further comprises computing a basis of each reduced subspace of signal values.

4. The method of claim 3, wherein the reduced subspaces are complementary.

5. The method of claim 1, wherein the generating further comprises determining the achievable capacity rate for each subset by employing inequality formulations relating the dimension parameters to the achievable capacity rates.

6. The method of claim 5, wherein the generating further comprises determining a parameter matrix that is partitioned in accordance with the dimension parameters and with the achievable capacity rates.

7. The method of claim 6, wherein the generating further comprises sizing partitions of columns of the parameter matrix in accordance with the dimension parameters, sizing partitions of rows of the parameter matrix in accordance with the achievable capacity rates and populating the parameter matrix in overlapping partitions of rows and columns corresponding to subsets having at least one common receiver.

8. A non-transitory computer readable storage medium comprising a computer readable program, wherein the computer readable program when executed on a computer causes the computer to:
   determine indications of signal transformations imposed by communication links with a plurality of receivers that are grouped into subsets of receivers;
   generate a coding design by employing dimension parameters that are related to achievable capacity rates of the subsets of receivers and are determined by constraining a sum of the dimension parameters to be less than or equal a dimension of a union of subspaces of signal values that are receivable by the receivers; and
   apply the coding design to multicast information to generate output signals for transmission to the plurality of receivers,
   wherein each subspace denotes signal values that are receivable by receivers in a different subset, and
   wherein the computer readable program further causes the computer to determine a reduced subspace for each of the subspaces such that the dimension of each reduced subspace is equal to the dimension parameter that corresponds to a subset to which the reduced subspace corresponds and such that a dimension of a union of the reduced subspaces is equal to the sum of the dimension parameters.

9. A system for coding multicast information signals, the system comprising:
   a controller configured to determine indications of signal transformations imposed by communication links with a plurality of receivers that are grouped into subsets of receivers and configured to generate a coding design by employing dimension parameters that are related to achievable capacity rates of the subsets of receivers and are determined by constraining a sum of the dimension parameters to be less than or equal to a dimension of a union of subspaces of signal values that are receivable by the receivers;
   a coder configured to generate output signals by applying the coding design to multicast information to compensate for the signal transformations; and
   a transmitter configured to transmit the output signals to the plurality of receivers,
   wherein each dimension parameter is determined for a different subset of receivers,
   wherein each subspace of signal values corresponds to a different subset of receivers and denotes signal values that are receivable by receivers in a corresponding subset, and
   wherein the coder is further configured to generate the coding design by determining a reduced subspace for each of the subspaces such that the dimension of each reduced subspace is equal to the dimension parameter that corresponds to the subset to which the reduced subspace corresponds and such that a dimension of a union of the reduced subspaces is equal to the sum of the dimension parameters.

10. The system of claim 9, wherein each subspace of signal values are receivable only by receivers in the subset corresponding to the subspace.

11. The system of claim 9, wherein the coder is further configured to generate the coding design by computing a basis of each reduced subspace of signal values.

12. The system of claim 11, wherein the reduced subspaces are complementary.

13. The system of claim 9, wherein the coder is further configured to generate the coding design by determining the achievable capacity rate for each subset by employing inequality formulations relating the dimension parameters with the achievable capacity rates.

14. The system of claim 13, wherein the generating further comprises determining a parameter matrix that is partitioned in accordance to the dimension parameters and with the achievable capacity rates.

15. The system of claim 14, wherein the coder is further configured to generate the coding design by sizing partitions of columns of the parameter matrix in accordance with the dimension parameters, sizing partitions of rows of the parameter matrix in accordance with the achievable capacity rates and populating the parameter matrix in overlapping partitions of rows and columns corresponding to subsets having at least one common receiver.

* * * * *